(12) United States Patent
Chung et al.

(10) Patent No.: US 8,842,072 B2
(45) Date of Patent: Sep. 23, 2014

(54) KEYPAD MOUSE COMPUTER PERIPHERAL DEVICE

(75) Inventors: Jun Hyuk Chung, Los Angeles, CA (US); William Shin, Los Angeles, CA (US)

(73) Assignee: Pareto Mill LLC, Los Angeles, CA (US)

(*) Notice: Subject to any disclaimer, the term of this patent is extended or adjusted under 35 U.S.C. 154(b) by 152 days.

(21) Appl. No.: 13/438,823

(22) Filed: Apr. 3, 2012

(65) Prior Publication Data

US 2013/0176225 A1 Jul. 11, 2013

Related U.S. Application Data

(60) Provisional application No. 61/583,578, filed on Jan. 5, 2012.

(51) Int. Cl.
*G06F 3/02* (2006.01)
*G06F 3/0354* (2013.01)

(52) U.S. Cl.
CPC .......... *G06F 3/0219* (2013.01); *G06F 3/03543* (2013.01); *G06F 3/0213* (2013.01)
USPC ........... 345/168; 345/169; 345/172; 345/173; 345/163; 178/18.06; 400/472

(58) Field of Classification Search
CPC ..... G06F 3/0216; G06F 3/029; G06F 3/0219; G06F 3/0238
USPC ................. 345/168–169, 158, 172–179, 163; 341/20–23; 361/679.08–679.17; 178/18.01–18.09; 400/472
See application file for complete search history.

(56) References Cited

U.S. PATENT DOCUMENTS

| | | | | |
|---|---|---|---|---|
| 5,661,505 | A * | 8/1997 | Livits | 345/169 |
| 5,689,253 | A * | 11/1997 | Hargreaves et al. | 341/22 |
| 6,005,496 | A * | 12/1999 | Hargreaves et al. | 341/22 |
| 6,348,878 | B1 * | 2/2002 | Tsubai | 341/23 |
| 6,492,997 | B1 * | 12/2002 | Gerba et al. | 715/721 |
| 7,499,032 | B1 * | 3/2009 | Mikan | 345/172 |
| 8,226,308 | B1 * | 7/2012 | Borg | 400/486 |
| 8,593,422 | B2 * | 11/2013 | Koch et al. | 345/173 |
| 2003/0067445 | A1 * | 4/2003 | Hirshberg et al. | 345/168 |
| 2004/0196264 | A1 * | 10/2004 | Criscione | 345/168 |
| 2009/0174669 | A1 * | 7/2009 | Shkolnikov | 345/169 |
| 2012/0013536 | A1 * | 1/2012 | VanDuyn et al. | 345/169 |
| 2012/0075193 | A1 * | 3/2012 | Marsden et al. | 345/168 |
| 2012/0113024 | A1 * | 5/2012 | Koch et al. | 345/173 |

* cited by examiner

*Primary Examiner* — Lun-Yi Lao
*Assistant Examiner* — Md Saiful A Siddiqui

(57) ABSTRACT

A keypad mouse computer peripheral device of the present disclosure includes a housing on top of which is located a keypad having a number keypad. The input device has at least one clicker button operable by a user's thumb while the user's hand rests on a provided palm rest or wrist rest. Force exerted by the base or palm portion of an operating hand moves the present input device which permits the index, middle and ring fingers to be located on the 4, 5, 6 key positions of the number keypad. This maintenance of the resting or home position even while the user is engaged in movement of the present keypad mouse permits easy and fast entry of numbers. A position sensor on the bottom surface of the housing of the disclosed keypad mouse detects relative location information for positional information input for a computer's graphical user interface.

18 Claims, 9 Drawing Sheets

KEYPAD MOUSE COMPUTER PERIPHERAL DEVICE

CROSS REFERENCE TO RELATED APPLICATIONS

This application claims priority to U.S. Provisional Application No. 61/583,578 filed on Jan. 5, 2012, the entirety of which is incorporated herein by reference.

FIELD OF THE INVENTION

The present disclosure generally relates to a keypad mouse computer peripheral device and embodiments thereof useful for providing input signals to a computer.

BACKGROUND OF THE INVENTION

Users make input to a computer to obtain constructive output after processing of the input by the computer. Reducing the time needed for obtaining computer output can be accomplished by decreasing computer processing time. Development of ever faster microprocessors has been successful in decreasing the time needed to perform required calculations in producing useful computer output.

Increased efficiency may also be obtained by reducing the time needed for user input. Often, the time needed for user input and not computer processing speed is the limiting factor in performing a required task. Currently, user input to a computer predominantly is made by the keyboard and the computer mouse.

The QWERTY keyboard is used to make alphabet and number inputs. A typical personal computer keyboard also contains additional keys such as directional keys, home, end, page up, page down, and function keys. With the advent of the graphical user interface, the computer mouse has been utilized to provide positional information and to enter commands with clicker buttons.

When using the keyboard, input time may be decreased by memorizing the location of specific keys so that time is not wasted by having to move the eyes from the screen to the keyboard. Time is lost by having to find the previous position on the computer screen after making the keyboard input.

To enter numbers on a traditional QWERTY keyboard, the top row which contains the ten digits is accessed. The left hand is used to enter the numbers 1, 2, 3, 4, and 5, and the right hand is used to enter the numbers 6, 7, 8, 9 and 0. When making inputs for mathematical calculations the shift key has to be pressed to access, among others, the "*", "+", "(", and ")" keys. Therefore, one hand cannot be used to easily and quickly make number entries and calculator inputs on a simple QWERTY keyboard.

In view of the foregoing, full sized computer keyboards also containing a number keypad positioned adjacent to and to the right of a QWERTY keyboard have come into use. A number keypad, or numpad or tenkey for short, contains the ten digits 0, 1, 2, 3, 4, 5, 6, 7, 8, and 9, and also the "+", "*", "−", and "enter" keys. With the number keypad, a user can make faster number inputs because only one hand is necessary to make all of the digit entries. The shift key does not have to be pressed to access the "+" and "*" keys. This assists in keeping the eyes on the computer screen. For number intensive computer applications such as the spreadsheet, the number keypad thus is primarily used to make number entries instead of the top row on a traditional QWERTY keyboard.

Even when using a number keypad for primarily for entering numbers, in using a computer application such as a spreadsheet, one still has to use a computer mouse. A mouse is needed for certain situations such as for selecting a cell or a series of cells which is not adjacent to the present cell or for selecting menu items or application icons. Even a user who is very proficient at entering numbers with a number keypad often has shift to his eyes away from the screen to find the computer mouse. At the very least, even if the eyes are still on the screen when finding the mouse, the right hand necessarily must leave the position on the number keypad with the middle finger on the button for the number 5. Returning the hand to this home position from the mouse without looking at the number keypad is difficult.

Existing devices combining the computer mouse and the number keypad have attempted to address this problem of eyes leaving the computer screen to find a computer mouse and also to find the number keypad. However, existing devices are not comfortable to use because the device size generally has been increased to accommodate the tenkey design. Thus, conventionally holding the device is awkward with the thumb and ring finger on the sides with the index and middle fingers on the left and right clicker buttons. Further, the placement of the left and right clicker buttons near the forward top portion forces the palm or wrist of the hand to be over the number keypad and accidental hitting of the number keys may result when using the device in such fashion as a computer mouse. Moreover, when using the left and right clicker buttons with the index and middle fingers and the holding the existing computer mouse number keypad device with the thumb and ring finger on the sides, the index, middle and ring fingers cannot be on the "4", "5" and "6" ready position which is optimal for making quick efficient number entries.

Therefore, in view of the foregoing, there exists a need in the art for a keypad mouse computer peripheral device which is comfortable to use, keeps the fingers on the most efficient ready home position on a provided number keypad as much as possible, and avoids accidental hitting of number keys when using the device as a computer mouse pointing device.

SUMMARY OF THE INVENTION

In an embodiment, a keypad mouse computer peripheral device of the present disclosure includes a housing on top of which is located a keypad having a numeric keypad. The input device has at least one clicker button operable by an operator's thumb while the operator's hand rests on a provided palm rest or wrist rest. Force exerted by the palm or wrist of an operating hand primarily moves the present input device which permits the index, middle and ring fingers to be located on the 4, 5, 6 key positions of the number keypad. This maintenance of the resting or home position even while the user is engaged in movement of the present keypad mouse permits easy and fast entry of numbers while minimizing relocation of the home position when resuming number entry. A position sensor on the bottom surface of the housing of the disclosed keypad mouse detects relative location information for positional information input for a computer's graphical user interface.

In some examples, a keypad having a numeric keypad including but not limited to one or more of the following additional keys or buttons: directional, tab, home, end, page up, page down, space, toggle, alt, control, function keys. In another embodiment, one or more keys of the keypad is capable of alphabetic input or is programmable by a user.

Many additional structural and operational variations that may be implemented in various examples of the inventive subject matter are provided in the description that follows.

DETAILED DESCRIPTION OF THE INVENTION

Figure 1:
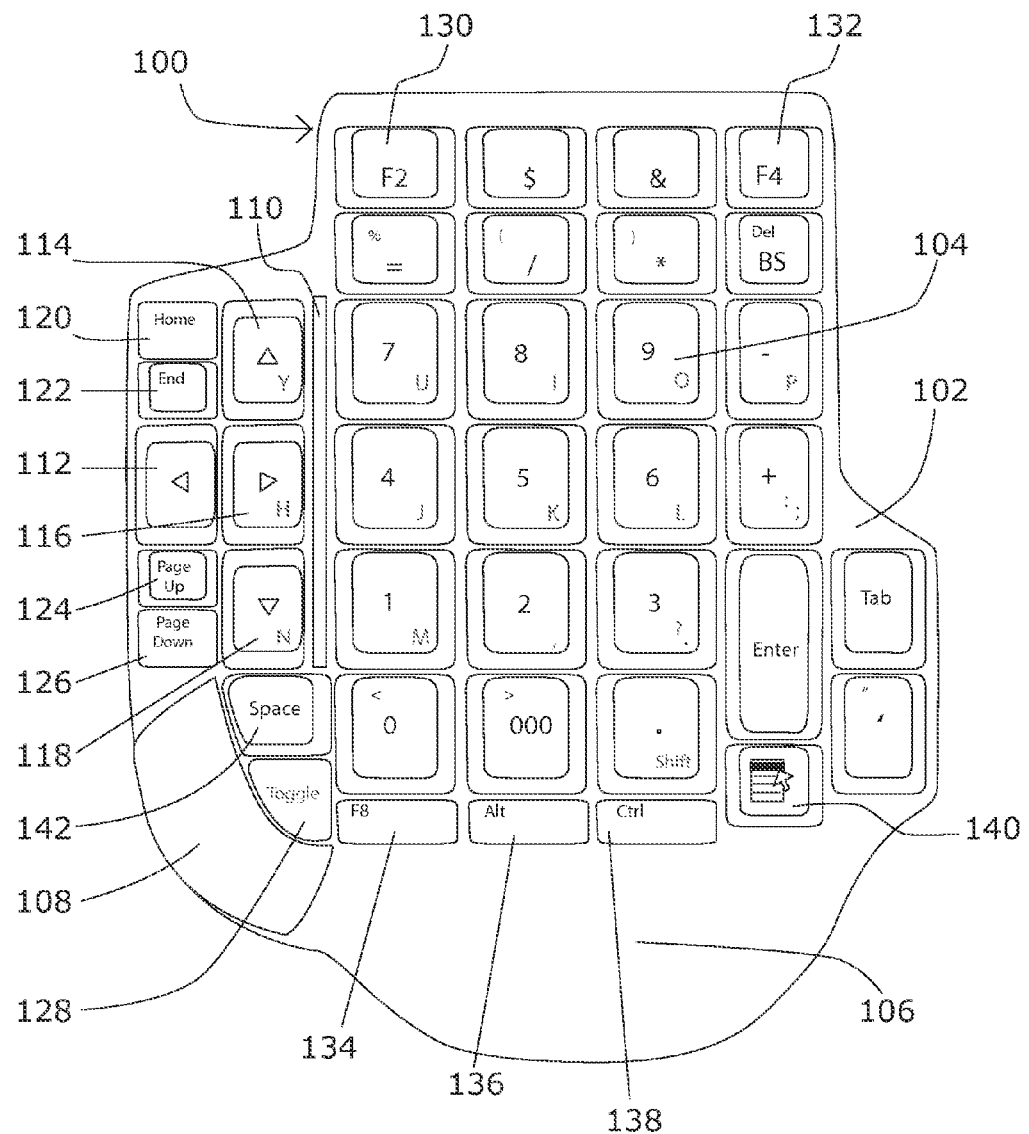
FIG. 1 depicts a top view of a keypad mouse peripheral device including a palm rest in accordance with an embodiment of the present disclosure.

A keypad mouse 100 (FIG. 1) in accordance with the present disclosure has a housing 102 on top of which is located a keypad having a numeric keypad 104, a palm rest 106 or wrist rest 802, and a thumb click button 108. Each of the numeric keypad 104, palm rest 106 or wrist rest 802 and thumb click button 108 is relatively positioned on the top surface of the keypad mouse such that when a base of an operating hand 202 (FIG. 2) is positioned on the palm rest or wrist rest, index 206, middle 208 and ring 210 fingers are positioned on 4, 5, and 6 keys (216, 218, 220) of the numeric keypad and the click button is operable by a thumb 204 of the hand while the index, middle and ring fingers are on the 4, 5, and 6 keys of the numeric keypad. As used herein, a base of an operating hand is defined as the palm or wrist or both the palm or wrist of an operating hand.

Figure 5:
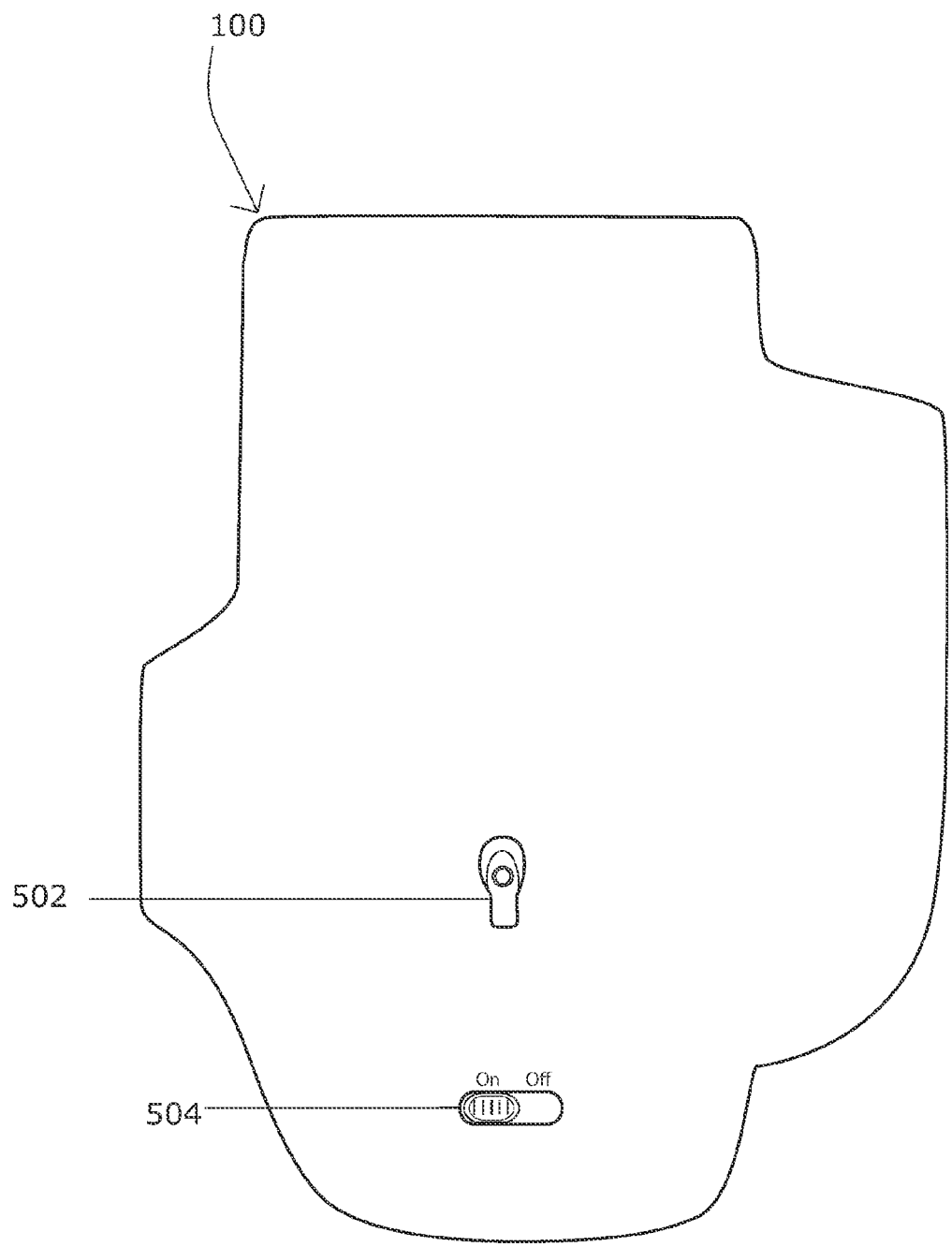
FIG. 5 depicts a bottom view of a keypad mouse peripheral device including a palm rest in accordance with an embodiment of the present disclosure.

Additionally, a position sensor 502 (FIG. 5) is located on a bottom surface of the housing. A position sensor, in accordance with the scope and content of the present disclosure, may employ any technology which permits two dimensional location determination. Examples of such technology, as one of ordinary skill in the art understands are, mechanical ball, optical, and laser tracking technology.

A housing 102 forms a casing around and provides structure for the various embodiments of a keypad mouse in accordance with the scope and content of the present disclosure. The housing may be made of, but not limited to, material such as plastic which typically serves as the material for a housing of existing computer mice or computer keyboard.

A keypad mouse as disclosed herein includes a numeric keypad that is located on a top surface or top part of the housing of the present keypad mouse. Top surface as used herein is the part which may be seen from a view from above when the keypad mouse is resting on a surface, with a position sensor directly facing the surface. The aforementioned housing may surround the keys of the keypad as the keys may be located through one or more openings on a top side of the structural housing.

A keypad within the scope and content of the present disclosure is a set of keys laid out to be accessible by fingers of an operating hand for computer entry. A keypad as used herein is not necessarily equivalent to a number keypad. Thus, the keypad as used herein includes a numeric keypad but may also include additional keys in various disclosed embodiments.

Numeric keypad or number keypad or numpad or tenkey are used as equivalents herein. A numeric keypad includes digits 0 to 9, addition (+), subtraction (−), multiplication (*) and division (/) symbols, a decimal point (.) and and Enter keys. As one of ordinary skill in the art understands, numeric keypads are useful for entering long sequences of numbers quickly, for example in spreadsheets, financial/accounting programs, and calculators. Input in this style is similar to that of a calculator or adding machine.

A numeric keypad in accordance with the present disclosure may or may not include a Num Lock key. Moreover, the numeric keypad may also include a "000" key in addition to the digit 0. Inclusion of the "000" key assists in faster number entry when multiple digit 0 entries with greater than three zeroes are necessary.

A keypad mouse as disclosed herein includes at least one computer mouse click button. The at least one computer mouse click button will include one click button which may be clicked by a thumb of an operating hand of a user. With the thumb of the operating hand of a user positioned on the click button the index, middle and ring fingers will naturally be positioned on digits 4, 5, and 6 respectively of the number keypad. Base of the operating hand naturally would then be on the palm rest or wrist rest because of the physiology of the human hand and because of the construction of the presently disclosed keypad mouse.

Ready positioning of the index, middle and ring fingers on digits 4, 5 and 6 is ideal for fast number entry. Such positioning allows entry of numbers in a fashion that is no different to using a number keypad of a full sized desktop computer keyboard for example. Transitioning from using the present keypad mouse as a computer mouse to using it to make fast number entries is achieved by attaining to this "home position" without having to take the eyes off the computer screen. Home position as used herein is the ready position where the index, middle and ring fingers rest on digits of an operating hand is positioned on digits 4, 5, and 6 respectively. Just movement of the thumb from the click button to rest on digit 0 of the presently disclosed number keypad is what is required to transition to number entry and not movement of the entire hand as in existing computer mice having a number keypad. When making fast number entries is necessary for applications such as spreadsheets, financial/accounting programs, and calculators, not having to move the user's eyes from a computer screen to find for example, such positioning allows comfortable access to the necessary keys.

Comfortable access to the necessary keys and the overall comfort of the operating hand is assisted by a palm rest or wrist rest which forms a part of the presently disclosed keypad mouse. The palm rest or wrist rest provides an area where the base of the operating hand may rest even while making fast number entries so that muscle energy spent to keep the fingers above the necessary keys for entry is minimized.

Figure 8:
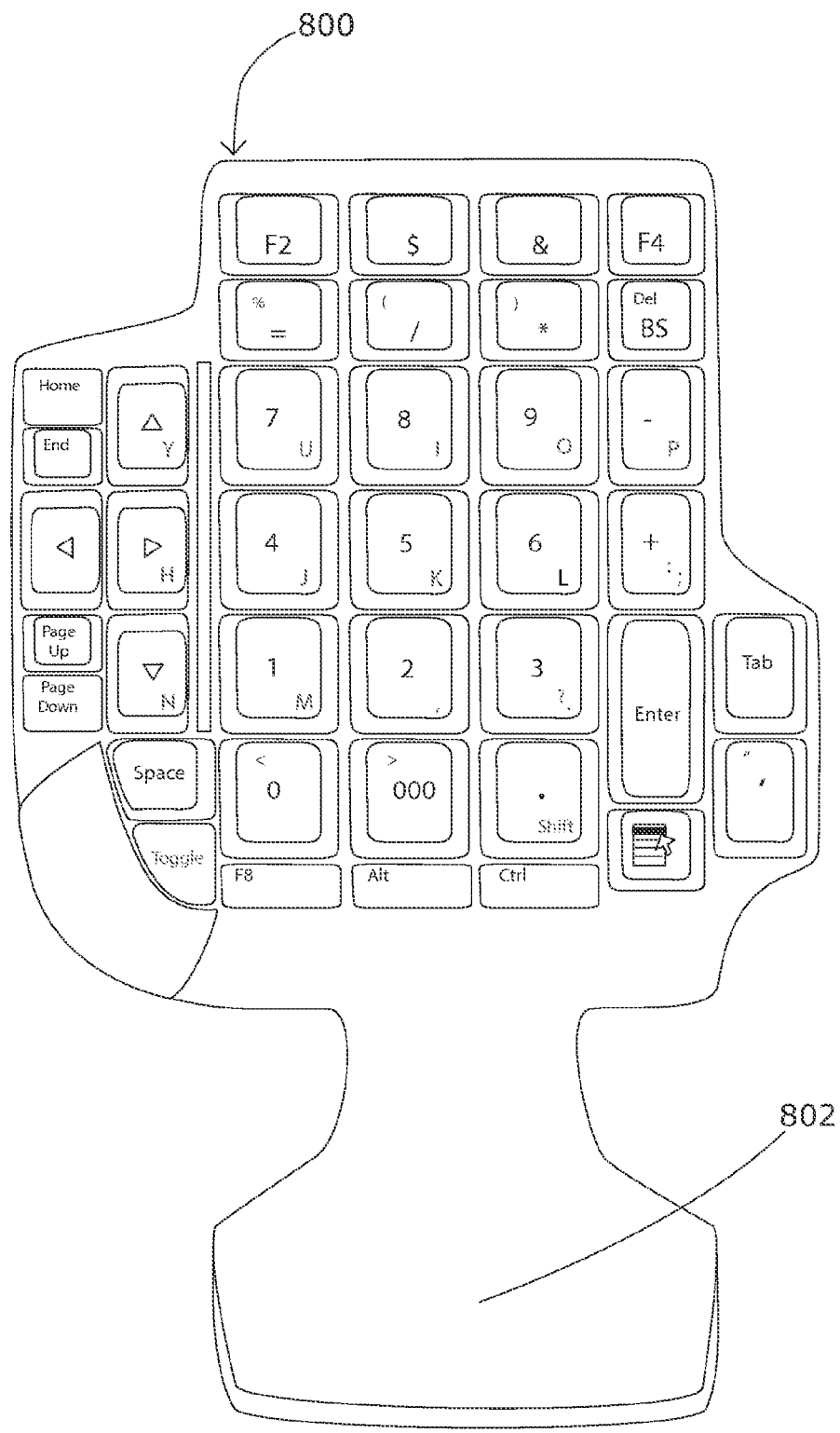
FIG. 8 depicts a top view of a keypad mouse peripheral device including a wrist rest in accordance with an embodiment of the present disclosure.
Figure 9:
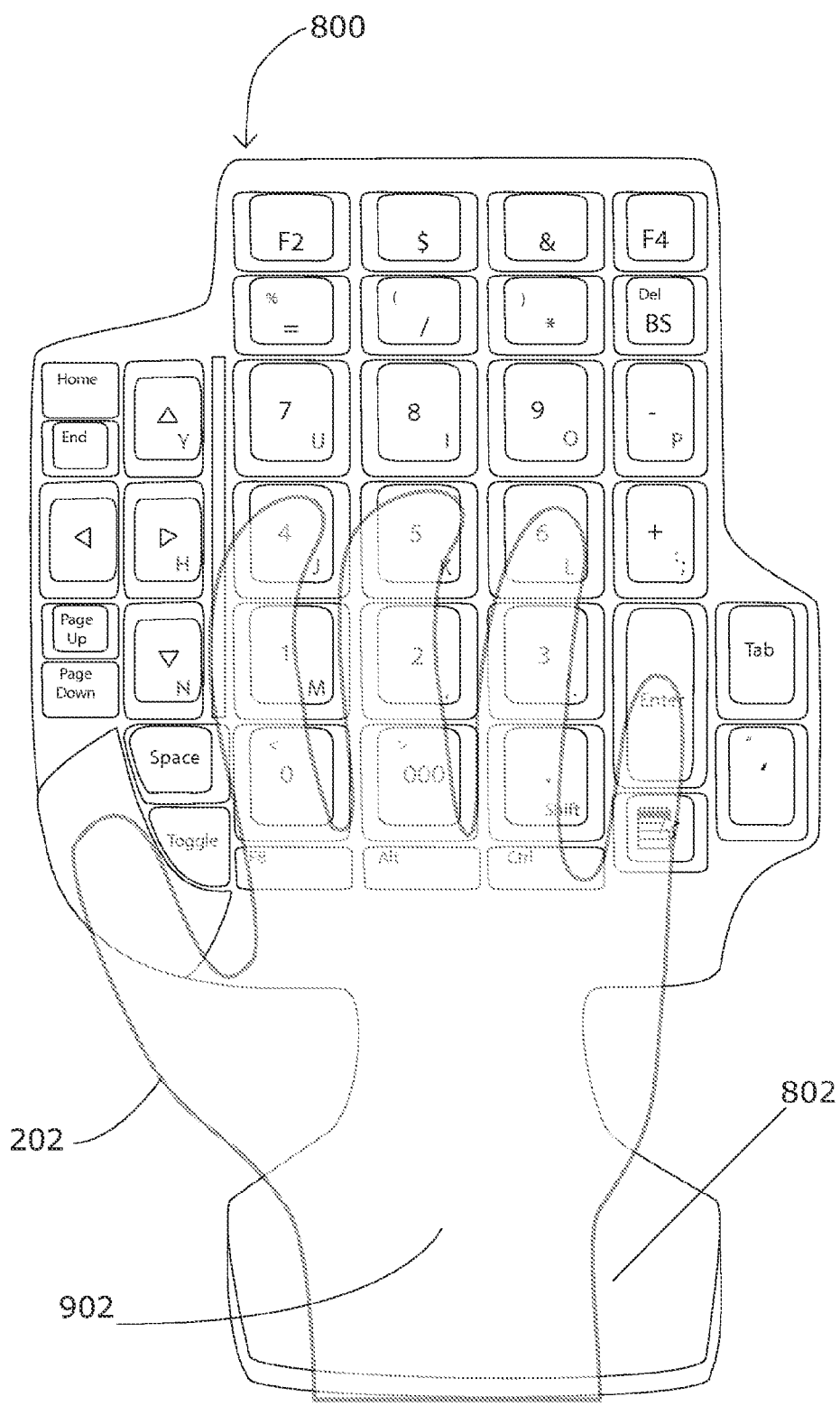
FIG. 9 depicts a top view of a keypad mouse peripheral device including a wrist rest and also illustrating an operating hand in accordance with an embodiment of the present disclosure.

Moreover, the palm 214 or wrist 902 (FIG. 9) of an operating hand may provide the contact area through which force is applied to move the present keypad mouse. In an embodiment, wherein a palm rest is provided such as in FIGS. 1-7, a palm 214 of an operating hand wrests on the palm rest and moves the instant keypad mouse. The index, middle and ring fingers being in contact with the 4, 5 and 6 number keys of the number keypad may also provide additional force to assist in movement of the keypad mouse. In an embodiment, wherein a wrist rest is provided such as in FIGS. 8-9, a wrist 902 of an operating hand wrests on the wrist rest 802 and moves the instant keypad mouse with wrist rest 800. The index, middle and ring finger being in contact with the 4, 5 and 6 number keys of the number keypad may also provide additional force to assist in movement of the keypad mouse.

Figure 2:
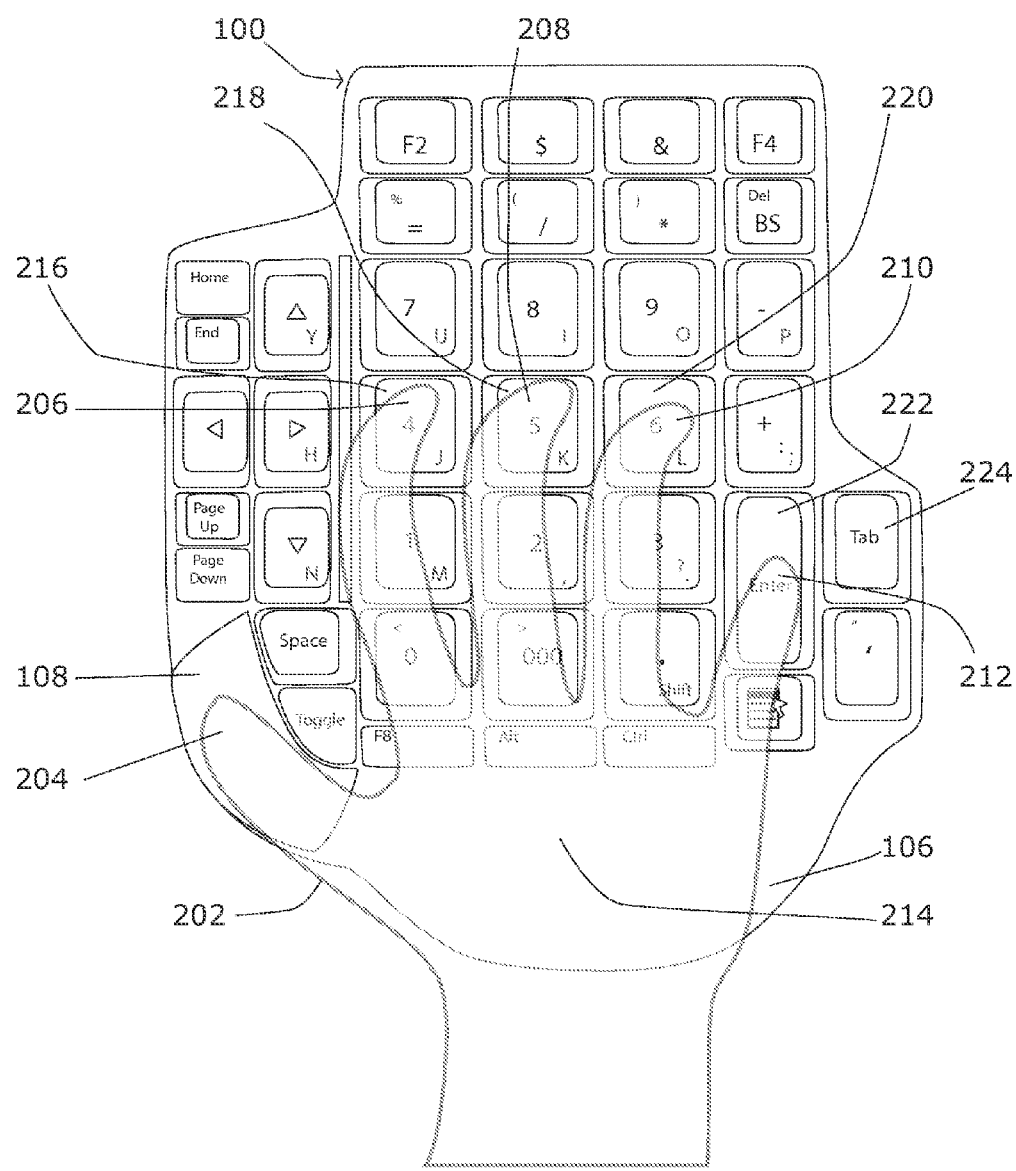
FIG. 2 depicts a top view of a keypad mouse peripheral device including a palm rest and also illustrating an operating hand in accordance with an embodiment of the present disclosure.
Figure 3:
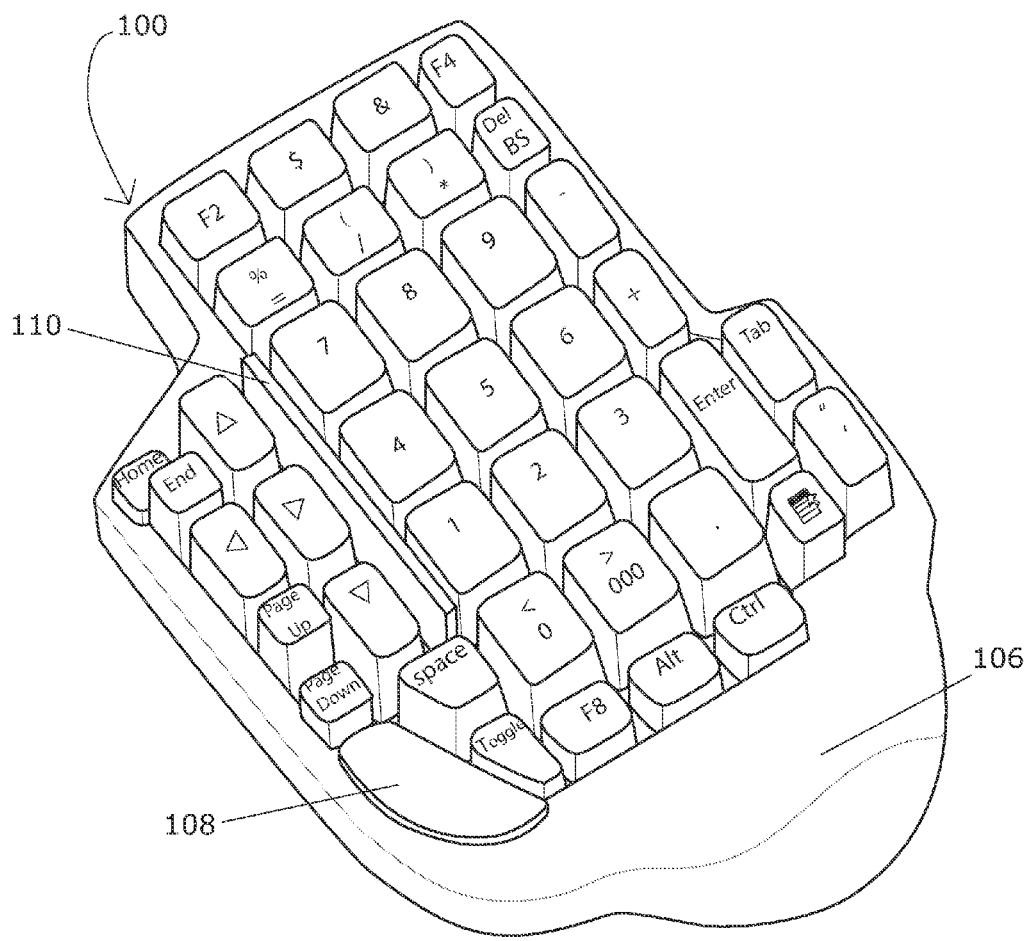
FIG. 3 depicts a perspective view of a keypad mouse peripheral device including a palm rest in accordance with an embodiment of the present disclosure.
Figure 4:
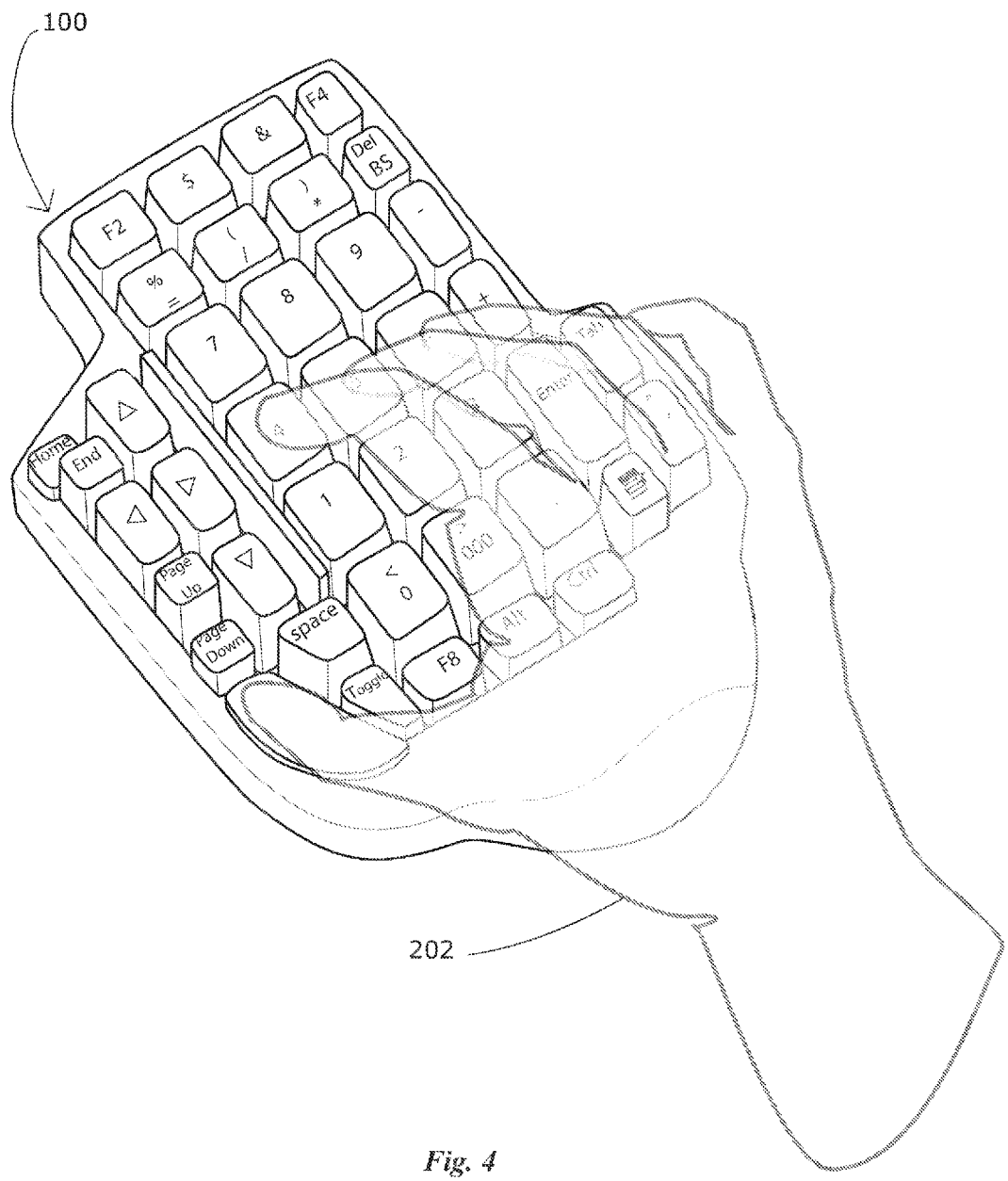
FIG. 4 depicts a perspective view of a keypad mouse peripheral device including a palm rest and also illustrating an operating hand in accordance with an embodiment of the present disclosure.

In additional embodiments, a keypad of the present keypad mouse may include keys in addition to the keys of a number keypad. An example of such a set of keys is the directional keys as illustrated in FIG. 1 (112, 114, 116, 118). Directional keys as used herein include the left 112, right 116, up 114, and down 118 arrow keys. In an embodiment, the directional keys are in the shape of a sideways T. By "sideways T" it is meant that up arrow, right arrow and down arrow are lined up as over a vertical line and the left arrow is located to the left of the right arrow. Sideways T configured directional keys allow easy access to them by the simple movement of the index finger from digit 4. In an embodiment, simple movement of the index finger is all that is required to access the directional keys. This permits the other fingers to remain or not stray far from the aforementioned home position. Thus, even the placement of the directional keys encourages keeping the eyes on the computer screen and further results in greater work efficiency.

It is also within the scope and content of the present disclosure to include various embodiments of the instant keypad mouse to be used when the operating hand is the left hand as well as when the operating hand is the right hand. For embodiments of the keypad mouse where the operating hand is the left hand, the relative positioning of the numeric keypad, palm rest or wrist rest and thumb click button still allows achievement of the aforementioned home position. Index, middle and ring fingers will be positioned over the 4, 5 and 6 keys respectively, while the left thumb is over the click button. Left-handed keypad mouse of the present disclosure would essentially be a mirror image of the respective right-handed keypad mouse. Thus, in the left-handed keypad mouse, the directional keys would have the up arrow, left arrow and down arrow lined up as over a vertical line with the right arrow being located to the right of the left arrow. This would be the "sideways T" configuration for a left-hand keypad mouse of the present disclosure.

When using existing numeric keypad computer mice which do not have any directional keys, a user must move the operating hand away from the mouse in order to find the necessary keys on a separate keyboard. The operator's eyes will move away from the computer screen to find the separate directional keys reducing work efficiency. Moreover, the "sideways T" configuration and accessibility by the index of the directional keys in alternative embodiments, encourages efficiency because the directional keys are on the keypad mouse and also because they are accessible without losing the home position on the number keypad.

In another embodiment, the keypad of the presently disclosed keypad mouse includes a Tab 224 key. Inclusion of a Tab key increases work efficiency especially when using a spreadsheet computer program such as MICROSOFT® EXCEL®. When working in EXCEL®, a user often uses the Tab key. This is because after entering data or information into a cell pressing the Tab key completes entry into a selected cell. When a Tab key is pressed the cursor moves to the adjacent cell located to the right of the previous cell. Pressing the Enter 222 key also completes entry into a cell. However, pressing the Enter key moves the cursor to the cell directly below the previous cell. When working in EXCEL®, it is often desired to move to the cell to the right of and not below the previous cell. In an embodiment, the Tab is located adjacent to the Enter key of the number keypad of the presently disclosed keypad mouse. In the right handed configuration, the Tab key would be located to the right of the Enter key and in the left handed configuration, the Tab key would be located to the left of the Enter key. In this embodiment, the Tab button is easily reached by the pinkie 212 or the $5^{th}$ finger of the operating hand thus allowing the index, middle and ring fingers to maintain the home position or be only slightly removed from the home position.

In alternative embodiments, the presently disclosed keypad mouse comprises the following buttons: home 120, end 122, page up 124 and page down 126 keys. These buttons which are additional to a traditional numeric keypad promote greater work efficiency by allowing the operating hand to remain on the keypad mouse and not travel to a separate keyboard for access. This helps in maintenance of the user's eyes on the computer screen.

Alternatively, a touchpad 110 may be positioned adjacent to the numeric keypad of the present keypad mouse. In an embodiment, the touch pad is located between the number keypad and the directional keys and accessible with an index finger of the operating hand. The touchpad's use as disclosed herein would be primarily for, but not limited to, a scroll function. Such scrolling may be accomplished by sliding the index finger up and down the touch pad. The touchpad may be in the shape of the thin strip to accommodate space savings and functional finger sliding as well as promoting ergonomic aesthetics.

In accordance with another embodiment of the presently disclosed keypad mouse, a scroll wheel 602 (FIG. 6) may be included. A scroll wheel may alternatively be used for screen scrolling instead of a touchpad.

In yet another embodiment, a toggle button is included in the disclosed keypad. The toggle button 128 when pressed switches the mode of the affected keys to another mode. For example, pressing the toggle button twice allows the number keys and additional keys to be used for alphabet input. Pressing the toggle button once returns the key entry mode to the default mode in which the number keypad is used for making number entries. In an embodiment, an included toggle button, is positioned on the keypad such that it is easily reached and operable by the thumb of the operating hand.

Alternatively, a space button 140 is included in various embodiments of the presently disclosed keypad mouse. Inclusion of the space button helps increase efficiency because the operating hand may be maintained on the keypad mouse. In an embodiment, an included space button, is positioned on the keypad such that it is easily reached and operable by a thumb of the operating hand.

In a further embodiment, at least one key of the keypad has height which is less than the height of at least another key of the keypad. This embodiment may include keys that are standard height and at least one key with laptop key height. For example, standard "full-travel" alphanumeric keyboards may have keys that are typically on three-quarter inch centers (0.750 inches, 19.05 mm), and have a key travel of at least 0.150 inches (3.81 mm). Keys on laptops and notebook computers usually have a shorter travel distance for a keystroke. Keys having a height less than the height of other keys on the keypad of the keypad mouse may, for example, have a height that is similar to that of standard laptop or notebook computer keys. Including keys with reduced height helps avoid inadvertent contact with mistyping by a finger or base of an operating hand. In an embodiment, the reduced height keys are one or more of the following: the Home 120, Page Down 126, Toggle 128, F8 134, Alt 136, and Ctrl 138 keys.

It is worthy to note that the aforementioned varied heights of the keys of the presently disclosed keypad, in addition to the relative placement of the parts of the present keypad mouse, is a reason why the instant keypad mouse does not require a lock button or switch to turn keys off. Existing number keypad computer mouse combinations often must employ a lock button or switch because accidental hitting of keys occur more often when the index and middle fingers are used to operate the clicker buttons of such as mouse while also using them to make number entries. The lock button or switch is necessary for going back and forth between computer mouse mode and keyboard mode for these devices. Obviously, such switching reduces efficiency by forcing the operator to move the eyes off the computer screen and fingers away from the desired number keypad home position.

In another embodiment, the keys of the keypad are capable of alphabet input. The alphabet key function is accessed by the pressing of the toggle button. For example, it may be pressed twice to access the alphabet key function at any time. Pressing the toggle button once returns the mode to number entry mode. No matter which mode the key pad is in, the keypad may be configured so that pressing the toggle button puts the keys in number entry mode and pressing it twice puts the keys in alphabet entry mode.

Alternatively, the keys of the keypad are programmable by an operator of the presently disclosed keypad mouse. The programmable keys can be configured to perform a variety of custom commands. For example, a very basic programmable key function might be for to access favorite programs with one click. For example, a user may link the first button to an email program, another to a web browser, and another to a word processing program, allowing for quick access to these frequently-used programs. Alternatively, the programmable key function of the instant keypad mouse may be used to magnify or reduce the size of an image on the screen, or to put the computer into a state of suspension or hibernation, for example.

In a further embodiment, the keypad of the presently disclosed keypad mouse includes function keys. In an embodiment, the included function keys are F2 130, F4 132 and F8 222 buttons. Pressing F2 in the spreadsheet program MICROSOFT® EXCEL® permits a user to edit the cell that is currently active. This will also put the cursor at the end of whatever is currently in the cell, making this a good way to quickly add inputs to the current contents. Thus, F2 is often used in financial applications so that the contents of an existing cell are not totally deleted before editing. Also, in MICROSOFT® EXCEL®, the F4 button shortcut is used when a user wants to repeat the last action that he has just taken by selecting the range of cells where the action is desired to be repeated. For example, if one has just deleted a row and he wants to delete another row, he can simply select the range where he wants to delete the next row and press F4. If the user has just added cell borders to a range and he wants to format another range the same way, F4 will repeat the previous action for him. This is often most useful when the user want to repeat an action over and over. Pressing the F8 shortcut button allows a user in MICROSOFT® EXCEL® to enter an extend mode which allows the arrow keys will extend the selection. The F2, F4, and F8 keys are very useful and often used keys in MICROSOFT EXCEL and inclusion of the keys on the present keypad mouse helps increase work efficiency.

Figure 6:
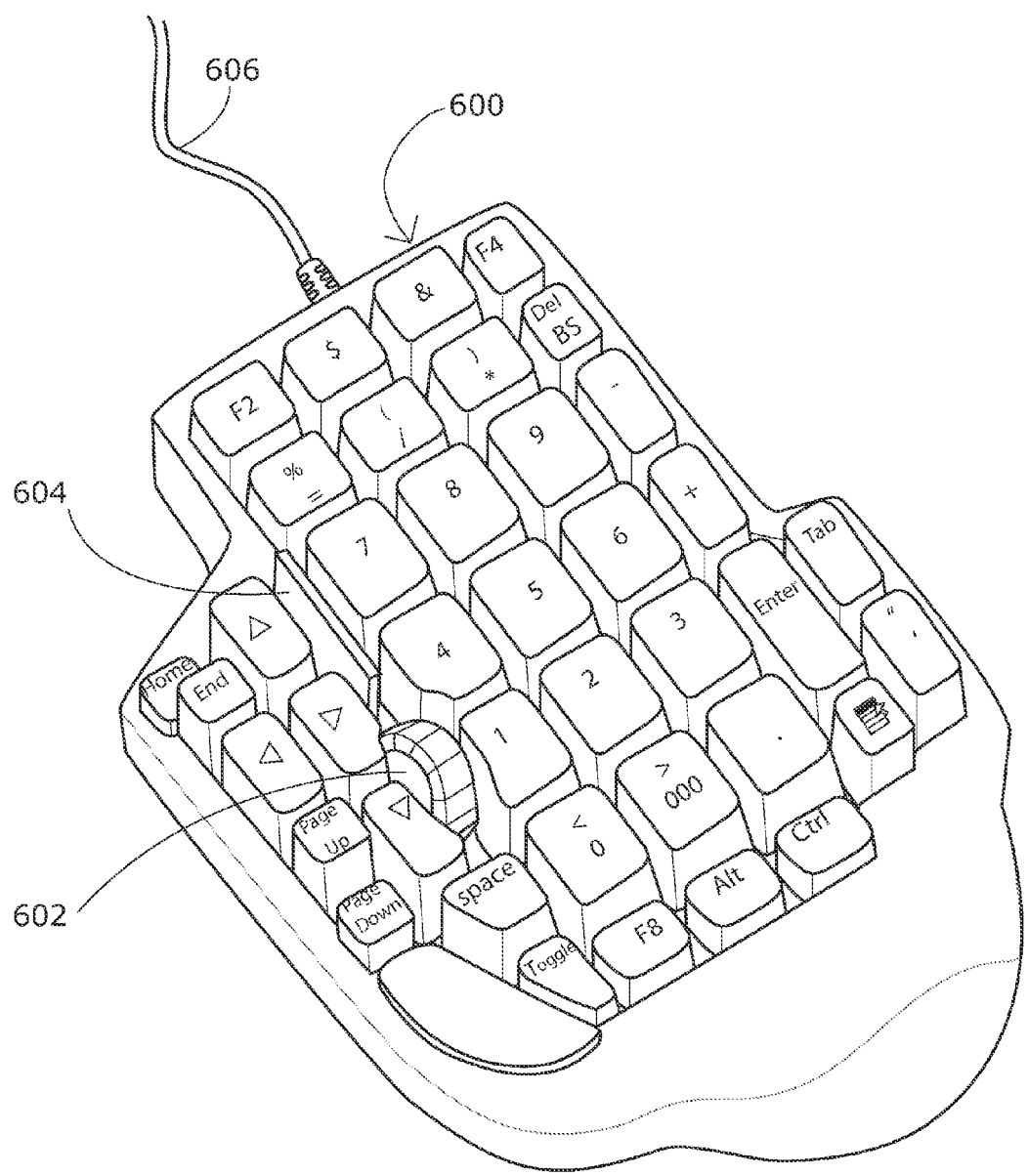
FIG. 6 depicts a perspective view of a keypad mouse peripheral device including a palm rest and a mechanical scroll wheel in accordance with an embodiment of the present disclosure.
Figure 7:
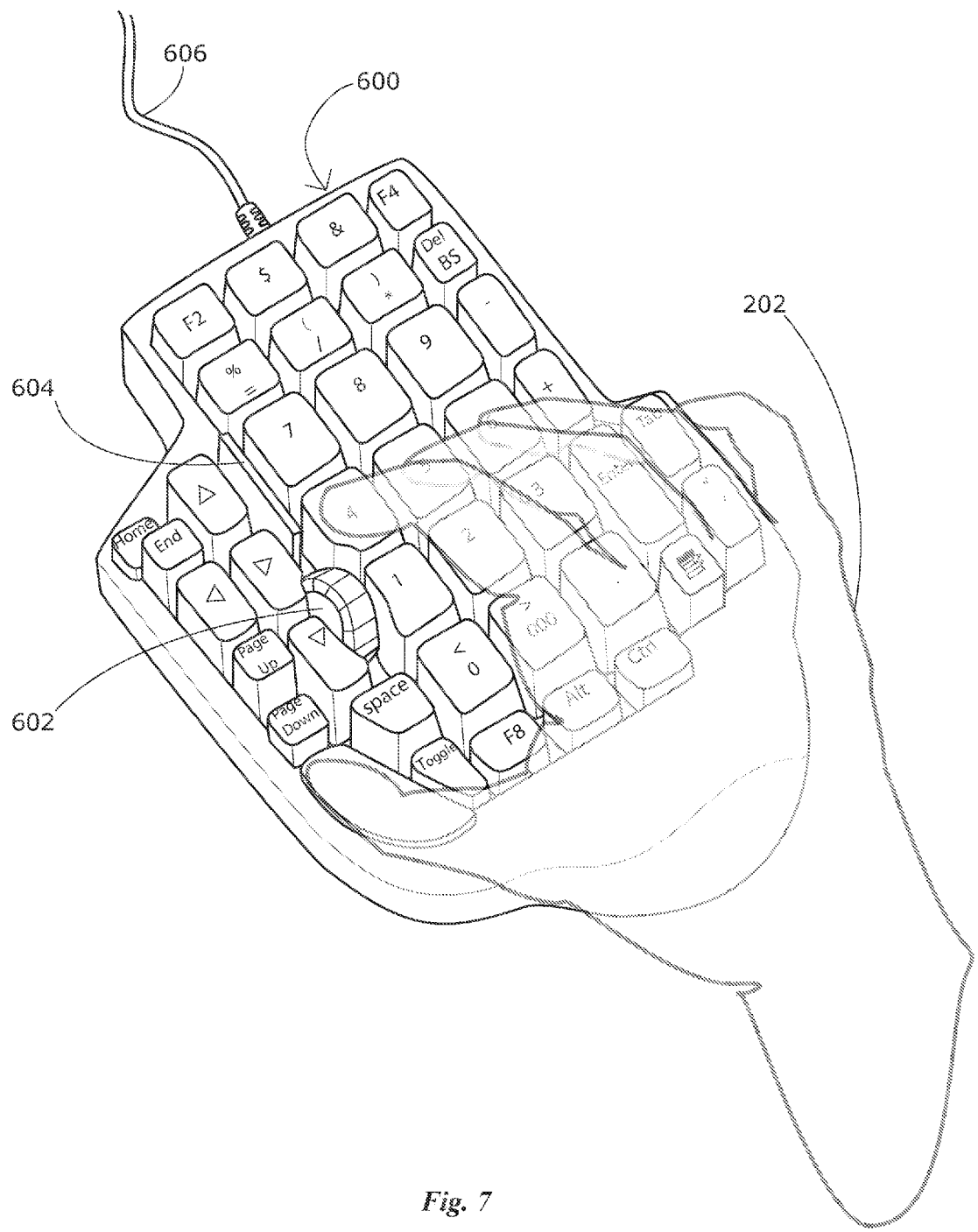
FIG. 7 depicts a perspective view of a keypad mouse peripheral device including a palm rest and a mechanical scroll wheel and also illustrating an operating hand in accordance with an embodiment of the present disclosure.

The present keypad mouse may be connected to a computer by a wired connection via connection standards such as USB, PS/2 or other connection standards appropriate for connection of a computer peripheral device to a computer. FIG. 6-7 illustrate an embodiment of the present keypad mouse which is directed to a wired keypad mouse 600 including a wire 606. Alternatively, the present keypad mouse may be linked to a computer wirelessly, by communication via radio frequency or BLUETOOTH® for example.

It is also within the scope and content of the present disclosure to include an on/off switch 504 in another embodiment. The on/off switch is may be used by a user to turn the power on or the turn the power off for the instant keypad mouse.

The present keypad mouse may also have a mechanical scroll wheel and is illustrated by FIGS. 6 and 7 directed to a wired keypad mouse with a mechanical scroll wheel 600. Although, FIGS. 6 and 7 illustrate a wired keypad mouse, various embodiments of the present keypad mouse having a mechanical scroll wheel may be wired or wireless. Alternatively, an aesthetic guard 604 may be provided since there may be a larger gap between the directional keys and the number pad in the embodiments that include a mechanical scroll wheel. The aesthetic guard fills this gap.

EXAMPLE

The presently disclosed keypad mouse may be used by professionals, including certified public accountants (CPA's) and financial analysts, who utilize spreadsheets and applications that require various types of data entry. The average annual earnings for such professionals is $76,500 (INDEED. COM®). From the perspective of employers, this figure is typically higher. Assuming a 15% premium employers spend for medical insurance and other benefits, the average annual expense per employee is $88,000. This translates to an hourly wage of approximately $42. If the present keypad mouse is purchased for $45, and employers experience a 20% improvement in efficiency, employers can potentially attain a payback period of less than a day. Suppose employers will experience a 5% efficiency improvement. A 5% improvement results in a payback period of one week.

These calculations do not include the additional revenue that would result from the increased efficiency. With the revenue effect, the value proposition for this device becomes significantly more attractive.

The present description refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those skilled in the art to practice the invention. Many other embodiments may be utilized for practicing the inventive subject matter than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present disclosure includes a variety of combinations and/or integrations of the embodiments and examples described herein, as well as further embodiments and examples as defined within the scope of all claims based on this disclosure, as well as all legal equivalents of such claims. The terms "a," "an," "the" and similar referents used in the context of describing the invention (especially in the context of the following claims) are to be construed to cover both the singular and the plural, unless otherwise indicated herein or clearly contradicted by context.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. Furthermore, any cited references and printed publications are individually incorporated herein by reference in their entirety.

What is claimed is:

1. A push keypad mouse comprising:
a housing which forms a top surface on which is located
a push keypad comprising a numeric push keypad,
a palm rest or wrist rest,
a thumb click button;
wherein each of said numeric push keypad, palm rest or wrist rest, and thumb click button is relatively positioned on said top surface such that when base of an operating hand rests on said palm rest or wrist rest, index, middle and ring fingers of said hand are positioned on 4, 5 and 6 keys of said numeric push keypad and said click button is operable by a thumb of said hand while said index, middle and ring fingers are on said 4, 5 and 6 keys of said numeric push keypad; and
a position sensor on a bottom surface of said housing;
wherein said push keypad further comprises directional keys in the shape of a sideways T;
and further wherein said push keypad mouse comprises a touchpad positioned directly adjacent to said numeric push keypad, and accessible with said index finger of an operating hand, wherein said touchpad is positioned longitudinally directly between said numeric push keypad and said directional keys.

2. The push keypad mouse of claim 1, wherein said directional keys are operable by the index finger of said operating hand.

3. The push keypad mouse of claim 1, wherein said push keypad further comprises a Tab key.

4. The push keypad mouse of claim 3, wherein said tab key is positioned adjacent to the Enter key of said numeric push keypad.

5. The push keypad mouse of claim 1, wherein said push keypad further comprises home, end, page up, and page down keys.

6. The push keypad mouse of claim 1, further comprising a scroll wheel.

7. The push keypad mouse of claim 1, wherein said push keypad further comprises a toggle button.

8. The push keypad mouse of claim 1, wherein said push keypad further comprises a space button.

9. The push keypad mouse of claim 1, wherein at least one key of said push keypad has a height less than at least another key of said push keypad.

10. The push keypad mouse of claim 9, wherein said at least one key with lesser height is positioned on said push keypad to avoid inadvertent contact with a finger or base of an operating hand.

11. The push keypad mouse of claim 1, wherein said keys of said push keypad are capable of alphabet input.

12. The push keypad mouse of claim 1, wherein said keys of said push keypad are programmable by an operator.

13. The push keypad mouse of claim 1, wherein said push keypad further comprises function keys.

14. The push keypad mouse of claim 13, wherein at least three of said function keys are F2, F4 and F8 buttons.

15. The push keypad mouse of claim 1, wherein said push keypad further comprises Alt and Control keys.

16. The push keypad mouse of claim 1, further comprising an on/off switch on said bottom surface of said housing.

17. The push keypad mouse of claim 1, wherein said palm rest or wrist rest is a palm rest.

18. A push keypad mouse comprising:
a housing which forms a top surface on which is located
a push keypad comprising a numeric push keypad, directional keys,
a palm rest,
a thumb click button;
wherein each of said numeric push keypad, palm rest, and thumb click button are relatively positioned on said top surface such that when base of an operating hand rests on said wrist rest, index, middle and ring fingers of said hand are positioned on 4, 5 and 6 keys of said numeric push keypad and said click button is operable by a thumb of said hand while said index, middle and ring fingers are on said 4, 5 and 6 key of said numeric push keypad; and
a position sensor on a bottom surface of said housing,
wherein said push keypad further comprises directional keys in the shape of a sideways T;
and further wherein said push keypad mouse comprises a touchpad positioned directly adjacent to said numeric push keypad, and accessible with said index finger of an operating hand, wherein said touchpad is positioned longitudinally directly between said numeric push keypad and said directional keys.

* * * * *